Figure 1:
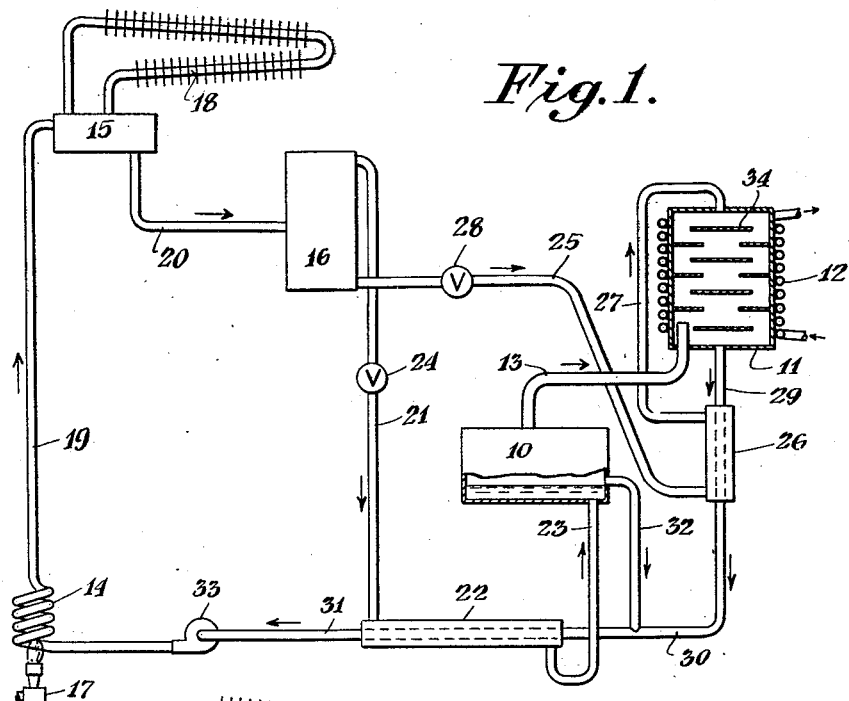

Aug. 1, 1944.  T. K. SHERWOOD  2,354,884
REFRIGERATION
Filed April 25, 1941

INVENTOR.
Thomas K. Sherwood
D. E. Heath
his ATTORNEY

Patented Aug. 1, 1944

2,354,884

UNITED STATES PATENT OFFICE 2,354,884

REFRIGERATION

Thomas K. Sherwood, Wellesley Hills, Mass., assignor to Servel, Inc., New York, N. Y., a corporation of Delaware Application April 25, 1941, Serial No. 390,257

15 Claims. (Cl. 62—119)

My invention relates to refrigeration and more particularly to heat operated refrigeration systems.

It is an object of the invention to provide a refrigeration system employing a small heat input. This is accomplished by utilizing a solution which when heated has the property of separating into its components which stratify. Fluid drawn from one stratum is evaporated to produce a refrigerating effect, and the resulting vapor is absorbed in fluid drawn from the other stratum.

Figure 2:
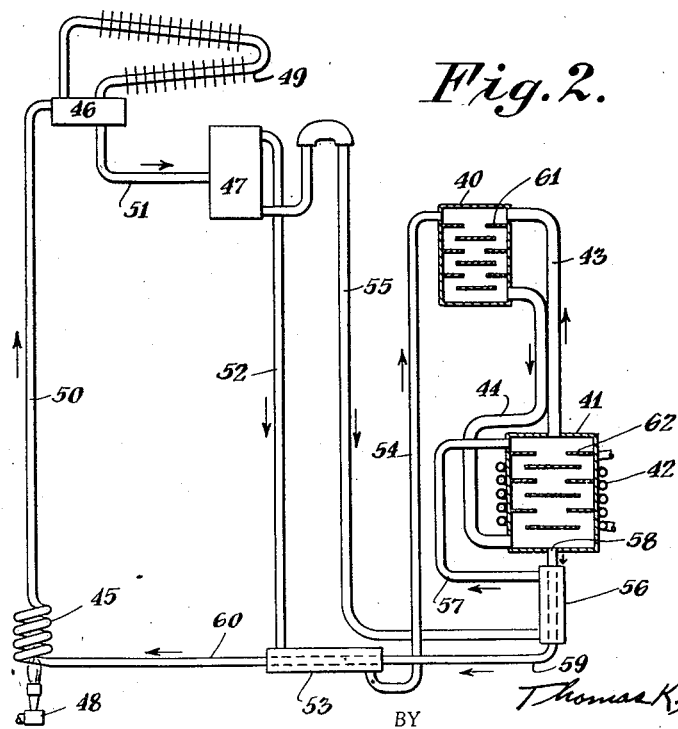

In the drawing:

Fig. 1 shows more or less diagrammatically a two-pressure refrigeration system embodying the invention; and Fig. 2 shows more or less diagrammatically a uniform pressure refrigeration system embodying the invention.

Referring to Fig. 1, the system includes an evaporator 10 and an absorber 11. The absorber is shown provided with a cooling coil 12. The absorber may be cooled in any other suitable manner as by air flow. The top of evaporator 10 is connected by a conduit 13 to absorber 11.

This system also includes a heater 14, a receiver 15, and a separator 16. Heater 14 is shown in the form of a coil heated by a burner 17. Receiver 15 is provided with a reflux condenser 18 comprising a finned coil connected at both ends to the receiver. The upper end of heater 14 is connected by a conduit 19 to receiver 15. The bottom of receiver 15 is connected by a conduit 20 to the separator vessel 16. Separator 16 is located at a level below that of the receiver 15, and conduit 20 is connected to separator 16 substantially midway of the top and bottom thereof.

The upper part of separator 16 is connected by a conduit 21, a liquid heat exchanger 22, and a conduit 23 to evaporator 10. A pressure reducing or expansion valve 24 is connected in this line between the separator and evaporator. It is shown connected in conduit 21. The lower part of separator 16 is connected by a conduit 25, a heat exchanger 26, and a conduit 27 to the upper part of absorber 11. A pressure reducing or expansion valve 28 is connected in this line between the separator and absorber. It is shown connected in conduit 25.

The bottom of absorber 11 is connected by a conduit 29, heat exchanger 26, a conduit 30, heat exchanger 22, and conduit 31 to the lower end of heater coil 14. Evaporator 10 is connected by a conduit 32 to conduit 30. Conduit 32 is connected to evaporator 10 at a point above the bottom of the evaporator so as to act as an overflow for liquid from the evaporator. A liquid pump 33 is connected in conduit 31 in a manner to cause flow of liquid through this conduit in the direction of heater 14. If desired, a vent conduit, not shown, may be connected between the top of separator 16 and the top of receiver 15.

The system just described is evacuated and charged with a solution which stratifies upon increase in temperature as, for example, a solution of water and triethylamine. Water solutions of diethylamine or methyldiethylamine may also be used.

Pump 33 causes flow of the solution of water and triethylamine through heater 14 and conduit 19 into receiver 15. When burner 17 is operating, the solution is heated in coil 14. Any vapor that may be formed due to this heating enters condenser 18 from receiver 15. The vapor condenses to liquid in condenser 18 and flows back into receiver 15. The heated solution flows from receiver 15 through conduit 20 into separator 16. At the higher temperature due to the described heating of the solution, the water and triethylamine stratify, and in separator 16 the lighter amine floats on top of the water. Liquid from the lighter layer, consisting principally of triethylamine flows from the upper part of separator 16 through conduit 21, liquid heat exchanger 22, and conduit 23 into evaporator 10. Liquid from the heavier layer, consisting principally of water, flows from separator 16 through conduit 25, heat exchanger 26 and conduit 27 into the top of absorber 11. The triethylamine evaporates in evaporator 10, producing a refrigerating effect. The resulting vapor flows from evaporator 10 through conduit 13 into absorber 11. Water flows downward over baffle plates 34 in absorber 11 and absorbs the vaporous triethylamine, thus reforming the solution. This solution flows from the absorber through conduit 29, heat exchanger 26, conduit 30, heat exchanger 22, and conduit 31 back to heater 14, this flow being part of the circulation caused by pump 33. Any excess liquid in evaporator 10 overflows through conduit 32 and joins the solution in conduit 30.

Whatever combination of fluids is used, the fluid having the higher vapor pressure at low temperature is used as the refrigerant, and the other fluid which has the lower vapor pressure is used as the absorbent. Both fluids have substantially the same vapor pressure at the high temperature at which they are separated by stratification. Also, whatever combination of fluids is used, the heavier fluid is drawn from the bottom of the separator and the lighter fluid from the top.

Referring to Fig. 2, the system includes an evaporator 40 and an absorber 41. Absorber 41 is shown provided with a liquid cooling coil 42. Other means such as air may be used for cooling the absorber. The top of absorber 41 is connected to the top of evaporator 40 by a conduit 43. The lower part of evaporator 40 is conected by a conduit 44 to the lower part of absorber 41. Conduits 43 and 44 are arranged in heat exchange relation.

This system also includes a heater 45, a receiver 46, and a separator 47. Heater 45 is shown as a coil heated by a burner 48. An air cooled reflux condenser 49 is connected to receiver 46. The upper end of heater coil 45 is connected by a vapor lift conduit 50 to receiver 46. The bottom of receiver 46 is connected by a conduit 51 to separator 47 about midway the height thereof.

The upper part of separator 47 is connected by a conduit 52, a liquid heat exchanger 53, and a conduit 54 to the upper part of evaporator 40. The lower part of separator 47 is connected by a conduit 55, a liquid heat exchanger 56, and a conduit 57 to the upper part of absorber 41. Conduit 55 is provided with an upward loop, the top of this loop being enlarged and located on the same level as the upper end of conduit 52. The bottom of absorber 41 is connected by a conduit 58, heat exchanger 56, conduit 59, heat exchanger 53, and a conduit 60 to the lower end of heater coil 45. The top of loop 55 and the top of separator 47 may, if desired, be vented to the upper part of receiver 46 by conduits not shown.

The system described in connection with Fig. 2 is charged similarly to that described in connection with Fig. 1 except that there is also added an auxiliary inert fluid such as hydrogen.

When burner 48 is operating, the water solution of triethylamine is heated in coil 45 so that vapor is formed. This vapor flows upward through lift conduit 50, causing upward flow of liquid through this conduit into receiver 46. Vapor which enters receiver 46 flows into condenser 49. Vapor is condensed to liquid in condenser 49 and the liquid flows back into receiver 46. Liquid flows from receiver 46 through conduit 51 into separator 47. For the reason previously explained, triethylamine floats on top of the water in separator 47.

Triethylamine flows from separator 47 through conduit 52, liquid heat exchanger 53, and conduit 54 into the upper part of evaporator 40. Water flows from separator 47 through conduit 55, heat exchanger 56, and conduit 57 into the top of absorber 41. In evaporator 40, the refrigerant liquid flows downward over baffle plates 61 and evaporates and diffuses into the hydrogen, producing a refrigerating effect. The resulting mixture of vapor and gas flows from the evaporator through conduit 44 to the absorber. Conduit 44 also serves as a drain for unevaporated liquid from evaporator 40. Water flows downward over baffle plates 62 in the absorber and absorbs vaporous triethylamine, reforming the solution. The hydrogen gas flows from the absorber through conduit 43 back to the evaporator. The solution flows from the absorber through conduit 58, heat exchanger 56, conduit 59, heat exchanger 53, and conduit 60 back to the heater 45.

The invention as described above is subject to other changes and modifications as known in the art and is therefore not limited except as indicated in the following claims.

What is claimed is:

1. A refrigeration system containing a solution having the property of stratifying into its component liquids upon increase in temperature and including means for heating said solution to cause said stratification, an evaporator, an absorber, and means to direct one of said component liquids to said evaporator and another of said liquids to said absorber.

2. A refrigeration system including an evaporator, an absorber connected to receive vapor from said evaporator, a heater connected to receive liquid from said absorber, a separator vessel connected to receive liquid from said heater, said system containing liquids which are mutually soluble at a first temperature and immiscible at a higher temperature so that said liquids stratify in said separator, and conduits for conducting one of said liquids from said separator to said evaporator, and another of said liquids from said separator to said absorber.

3. A system as in claim 2 in which said liquids are water and one of the group consisting of triethylamine, diethylamine, and methyldiethylamine.

4. A refrigeration system including an evaporator, an absorber connected to receive vapor from said evaporator, a liquid circuit including said absorber, a heater, and a separator vessel, means for conducting liquid from said vessel to said circuit, said system containing liquids which are mutually soluble at a first temperature and immiscible at a higher temperature so that they separate by stratification in said separator.

5. A system as in claim 4 which also includes a reflux condenser for reliquifying any vapor that may be formed due to said heater.

6. A system as in claim 4 in which said means for causing circulation of liquid in said circuit is a pump, and flow of liquid to said absorber and to said evaporator takes place through pressure reducing means.

7. A system as in claim 4 in which said absorber is connected to receive vapor from said evaporator by means of an auxiliary fluid.

8. A system as in claim 4 in which said means for causing circulation of liquid in said circuit is a vapor liquid lift operated by vapor formed in said heater, and a condenser for liquifying vapor from said lift.

9. A system as in claim 4 in which said absorber is connected to receive vapor from said evaporator by means of an inert gas circuit in which they are included, and said means for causing circulation of liquid in said circuit is a vapor liquid lift.

10. A refrigeration system including an evaporator, an absorber, a conduit for vapor from said evaporator to said absorber, a heater, a conduit for liquid from said absorber to said heater, a pump in last said conduit to cause flow of liquid therethrough, a separator connected to receive liquid from said heater, a conduit from said separator to said evaporator, a conduit from said separator to said absorber, and pressure reducing means in each of said last two conduits, said system containing liquids which are mutually soluble at a first temperature and immiscible at a higher temperature, whereby these liquids separate by stratification in the separator and separately flow to said evaporator and absorber.

11. A refrigeration system including an evaporator, an absorber, conduits interconnecting said evaporator and absorber to form a circuit for inert gas, a heater, a conduit for liquid from said absorber to said heater, a separator, conduits including a vapor liquid lift for conducting liquid from said heater to said separator, a reflux condenser for liquifying vapor from said lift, and conduits connecting said separator for flow of liquid therefrom to each of said evaporator and absorber, said system containing liquids which are mutually soluble at a first temperature and immiscible at a higher temperature so that said liquids separate by stratification in said separator and flow separately to said evaporator and absorber.

12. A refrigeration system containing liquids which are mutually soluble at a first temperature and immiscible at a higher temperature and including means for heating said liquids to cause separation thereof by stratification, an evaporator connected to receive one of said separated liquids and an absorber connected to receive another of said separated liquids.

13. A method of refrigeration with the aid of liquids which are mutually soluble at a first temperature and immiscible at a higher temperature which consists in heating a solution of said fluids to said higher temperature to cause separation thereof by stratification, evaporating one of said separated fluids to produce refrigeration, and absorbing the resulting vapor into another of said separated fluids to reform said solution.

14. A method of refrigeration which consists in evaporating one of the group consisting of triethylamine, diethylamine, and methyldiethylamine to produce a refrigerating effect, absorbing the resulting vapor into water, and heating the resulting solution to cause separation of the water and ethylamine by stratification to be again used in the evaporation and absorption steps.

15. A method of refrigeration which includes evaporating liquid refrigerant to produce a refrigerating effect, absorbing resulting vapor into a liquid absorbent, said liquid refrigerant and liquid absorbent being mutually soluble at the temperature of absorption but immiscible at a higher temperature, and heating the solution to said higher temperature to cause separation of the refrigerant and absorbent by stratification for use again in said evaporation and absorption steps.

THOMAS K. SHERWOOD.